US006477660B1

(12) United States Patent
Söhner

(10) Patent No.: US 6,477,660 B1
(45) Date of Patent: *Nov. 5, 2002

(54) DATA MODEL FOR SUPPLY CHAIN PLANNING

(75) Inventor: Volkmar A. Söhner, Sinsheim (DE)

(73) Assignee: Sap Aktiengesellschaft, Walldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,840

(22) Filed: Mar. 3, 1998

(51) Int. Cl.$^7$ ................................................ G06F 11/00
(52) U.S. Cl. .................................. 714/1; 700/99; 705/8
(58) Field of Search ................................. 705/8; 700/97, 700/102, 99, 100, 106; 714/1

(56) References Cited

U.S. PATENT DOCUMENTS

| | | | |
|---|---|---|---|
| 5,229,948 A | | 7/1993 | Wei et al. |
| 5,243,531 A | * | 9/1993 | DiPippo et al. ............. 364/468 |
| 5,303,144 A | * | 4/1994 | Kawashima eat al. ...... 364/401 |
| 5,303,147 A | * | 4/1994 | Oba et al. ................... 364/402 |
| 5,331,545 A | | 7/1994 | Yajima et al. |
| 5,369,570 A | * | 11/1994 | Parad ......................... 364/401 |
| 5,467,265 A | * | 11/1995 | Yamada et al. ............. 364/154 |
| 5,619,695 A | * | 4/1997 | Arbabi et al. .............. 395/670 |
| 5,884,276 A | * | 3/1999 | Zhu et al. .................... 705/7 |
| 5,931,900 A | * | 8/1999 | Notani et al. .............. 709/201 |
| 5,971,585 A | * | 10/1999 | Dangat et al. .......... 364/468.08 |
| 5,974,395 A | * | 10/1999 | Bellini et al. ................ 705/9 |
| 5,995,945 A | * | 11/1999 | Notani et al. ................ 705/1 |
| 6,006,192 A | * | 12/1999 | Cheng et al. ............... 705/10 |

(List continued on next page.)

FOREIGN PATENT DOCUMENTS

| | | | |
|---|---|---|---|
| GB | 2302427 | 1/1997 | |
| WO | WO 97/00488 | * 1/1997 | ........... G06F/17/60 |

OTHER PUBLICATIONS

Fourer, Robert, "Database structures for mathematical programming models," Decision Support Systems, Aug. 1997, Elsevier, Netherlands, vol. 20, No. 4, pp. 317–344.*
Rosen, Kenneth H., Discrete Mathematics and Its Applications, McGraw Hill, 1999, pp. 384–395, 490–498.*
Fourer R: "Database structures for mathematical programming models", Decision Support Systems, Aug. 1997, Elsevier, Netherlands, vol. 20, No. 4, pp. 317–344.

Primary Examiner—Robert Beausoleil
Assistant Examiner—Bryce P. Bonzo
(74) Attorney, Agent, or Firm—Chadbourne & Parke, LLP

(57) ABSTRACT

A data model for a supply chain is provided whereby individual working steps in a production process are defined as activities, and organized groups of such activities are defined as orders. Activities are allocated to no more than one resource and contain information concerning the start and finish time for the activity, any resource on which the activity is currently scheduled, and a list of alternative resources, if any. Activities are linked to each other via auxiliary objects, which contain information concerning the minimum and maximum time between activities. Orders may contain input and/or output interface nodes, representing the materials consumed and produced by the order. Each output interface node representing a quantity of material created from one order is linked via an auxiliary object to respective input interface node or nodes from other orders that are scheduled to receive that material. Order anchors are defined whereby a planning algorithm can easily reference an order by its order number in a database table. Planning object anchors allow the planning algorithm to access all the orders for a given material, and resource anchors permit access to all activities scheduled for that resource.

22 Claims, 6 Drawing Sheets

U.S. PATENT DOCUMENTS

| | | | |
|---|---|---|---|
| 6,073,110 A | * 6/2000 | Rhodes et al. | 345/804 |
| 6,151,582 A | * 11/2000 | Huang et al. | 705/10 |
| 6,243,612 B1 | * 6/2001 | Rippenhagen et al. | 700/100 |
| 6,321,133 B1 | * 11/2001 | Smirnov et al. | 700/100 |
| 6,338,097 B1 | * 1/2002 | Krenzke et al. | 705/32 |
| 6,341,266 B1 | * 1/2002 | Braun | 705/7 |
| 6,349,287 B1 | * 2/2002 | Hayashi | 700/103 |
| 6,393,332 B1 | * 5/2002 | Gleditsch et al. | 700/100 |
| 2002/0016759 A1 | * 2/2002 | Macready et al. | 705/37 |

* cited by examiner

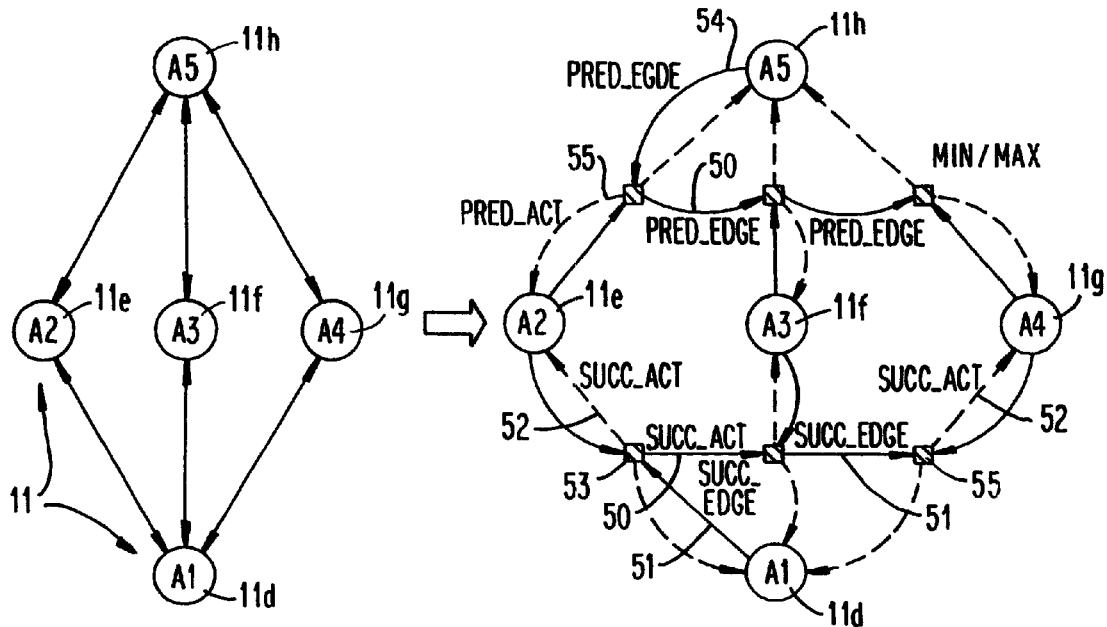
FIG_5a    FIG_5b
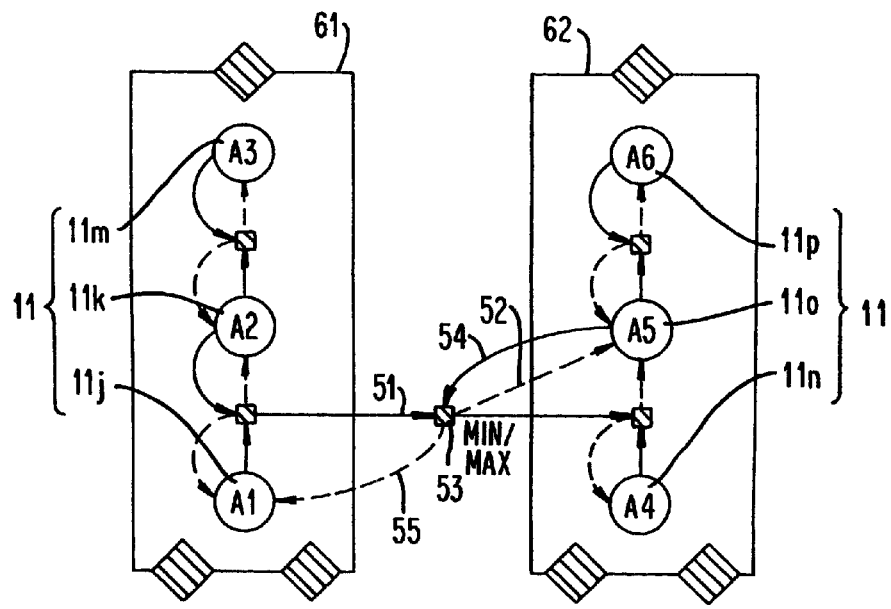
FIG_6

DATA MODEL FOR SUPPLY CHAIN PLANNING

BACKGROUND OF THE INVENTION

Supply chain planning, which comprises the logistical plan of an in-house supply chain, is essential to the success of many of today's manufacturing firms. Most manufacturing firms rely on supply chain planning in some form to ensure the timely delivery of products in response to customer demands. Typically, supply chain planning is hierarchical in nature, extending from distribution and production planning driven by customer orders, to materials and capacity requirements planning, to shop floor scheduling, manufacturing execution, and deployment of products. Supply chain planning ensures the smooth functioning of different aspects of production, from the ready supply of components to meet production demands to the timely transportation of finished goods from the factory to the customer.

The modern supply chain often encompasses a vast array of data. The planning applications that create and dynamically revise plans in the supply chain in response to changing demands and capacity require rapid access to data concerning the flow of materials through the supply chain. The efficient operation of the supply chain depends upon the ability of the various plans to adjust to changes, and the way in which the required data is stored determines the ease with which it can be accessed.

In the conventional relational model, supply chain data is stored in multiple relational database tables. If a parameter of a manufacturing order is changed, all of the aspects of the supply chain affected by such change must be re-calculated using the relational tables. Before a planning algorithm can change the date and/or quantity of a manufacturing order in response to changing capacities, for example, it must take into account the effect that the date and/or quantity change will have on other production and sales orders. Such a calculation is very complex, and requires that the algorithm have access to data concerning all the other orders, materials and resources that would be affected by the change. That information is not readily accessible in the conventional model, and instead must be calculated by tracing through relational database tables. Such calculations are cumbersome and delay planning functions unnecessarily.

There is therefore a need for all data relevant to supply chain planning to be stored in an efficient manner which reflects the progress of materials and orders along the supply chain. There is also a need for such data to be made available to planning algorithms in the most efficient and usable manner possible so as to reduce drastically the runtime of the planning functions.

SUMMARY OF THE INVENTION

The present invention relates to a data model for storing objects that are relevant for planning the logistical processes along the entire supply chain of a company.

It is an object of the invention to store manufacturing process data so as to provide planning algorithms and applications programs with the most efficient access possible to the data that they require.

It is a further object of this invention to store the data in a logical manner that reflects the progress of materials and orders along the supply chain.

It is a further object of this invention to define discrete data elements representing individual working steps in the production process, and to store the relationships between said elements.

It is a further object of this invention that specific information about each working step is linked with those data elements, including the start time, finish time, and the resources upon which the working step is performed or alternatively may be performed.

It is a further object of the invention to organize groups of working steps in the manufacturing process as objects that can be accessed by planning algorithms, and to store the relationships between said groups of working steps.

It is a further object of this invention to allow a planning algorithm efficient access to any organized group of working steps in the production process by providing a database table whereby each of the groups of working steps is referenced to its location in the data structure.

It is a further object of this invention to allow a planning algorithm efficient access to the working step performed by a given resource at a specific time, by providing a database table whereby the dates and times of all working steps performed by each resource are referenced to that resource.

It is a further object of the invention to allow a planning algorithm to have efficient access to organized groups of working steps involved in creating or consuming a specific material, by providing a database table whereby information identifying the material is referenced to the input or output of each such organized group of working steps.

In accordance with these and other objects, a data structure is defined whereby individual working steps in the production process are defined as activities, and organized groups of such activities are defined as orders. Activities are allocated to no more than one resource, if any, and contain information concerning the start and finish time for the activity, any resource on which the activity is currently scheduled, and a list of alternative resources, if any. Activities representing a time calculation only are not required to correspond to a resource. Activities are linked to each other via auxiliary objects, which contain information concerning the minimum and maximum time between activities. Orders may contain input and/or output interface nodes, representing the materials consumed and produced by activities within the order. An output interface node representing a quantity of material created from one order is linked via an auxiliary object to respective input interface node or nodes from other orders that require that material. Order anchors are defined whereby a planning algorithm can easily reference an order in the data structure by its order number in a database table. Planning object anchors allow the planning algorithm to access all the orders for a given material, and resource anchors permit access to all activities scheduled for that resource.

BRIEF DESCRIPTION OF THE DRAWINGS

FIG. 5 is a representation of how temporal constraints between activities are modeled.

FIG. 6 is a representation of how temporal constraints between orders are modeled.

DETAILED DESCRIPTION OF THE DRAWINGS

Figure 1:
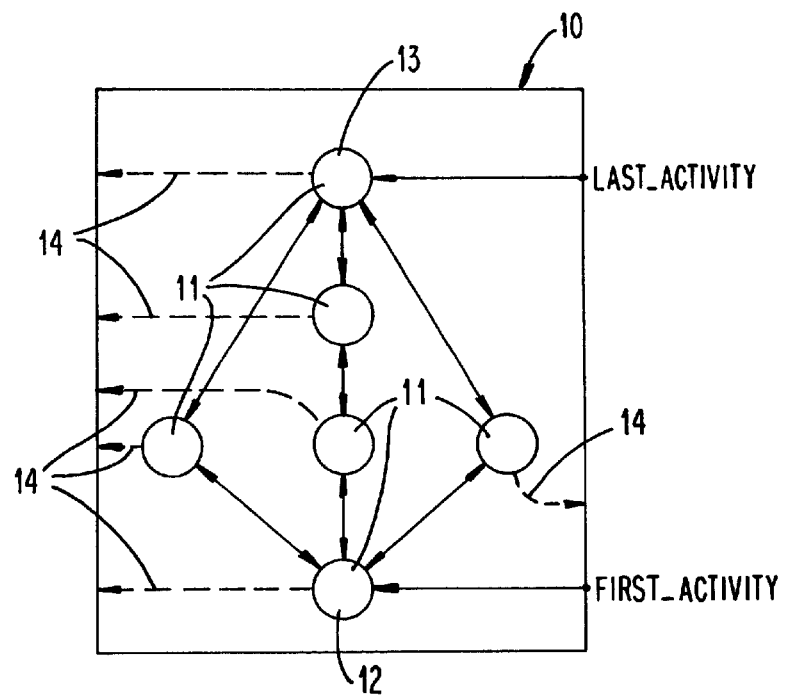
FIG. 1 is a representation of the relationship between an order and its activities.
Figure 2:
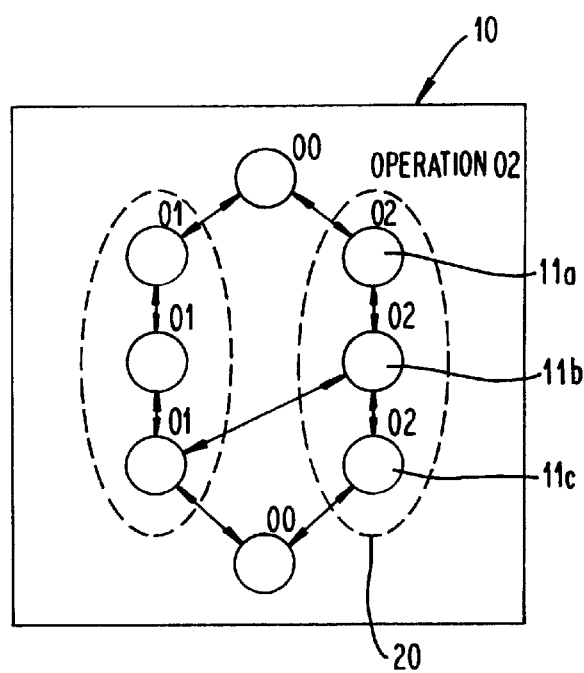
FIG. 2 is a representation of the fusing of activities to make operations.

As shown in FIG. 1, an order 10 represents an organizational unit that may group together several activities 11. Each order points to the first activity and the last activity of its activity network. Thus, order 10 points to activity 12 and activity 13. Each activity 11 contains a reference 14 to its corresponding orders. As depicted in FIG. 2, related activities such as a chain of activities 11a, 11b, and 11c that must be executed in order may be grouped together into an "operation" 20 to avoid having to map each activity individually on a planning table.

Figure 3:
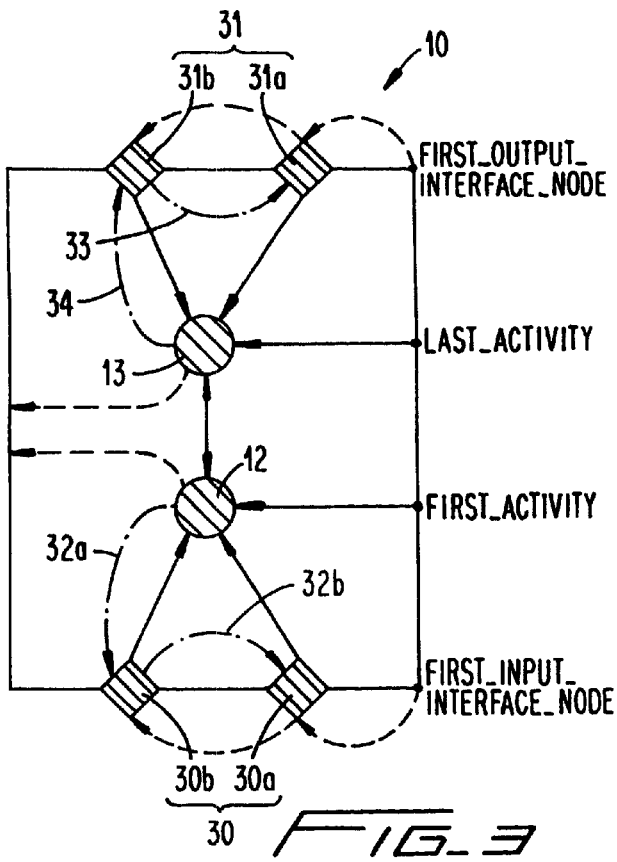
FIG. 3 is a representation of the input and output interface nodes of an order.

An order, such as order 10, may have one or more input interface nodes 30 and/or one or more output interface nodes 31, as shown in FIG. 3. Each input interface node 30 represents one material. An input interface node also has attributes containing information as to the quantity of the material required, the time requirement of the material, and the shortage of that material, which is derived from the difference between the quantity of material required and the quantity that it delivered by other orders or stock. Each output interface node 31 has similar attributes, such as type of material created, the quantity of the material, the time availability of the material, and the surplus of that material, which is derived from the quantity of material produced that is not yet delivered to other orders. Each input interface node 30 may refer to the activity 12, if any, in which the material that it represents is consumed, and each output interface node 31 points to the activity 13, if any, in which the material that it represents is created. If an activity 12 consumes a material, all input materials of this activity can be traced via arrow marked with dashes and dots 32a that points from activity 12 to input interface node 30. If input activity 12 consumes more than one material, arrow 32b joins input interface node 30a to the next input interface node 30b, which links on the same input activity 12. The chain of input interface nodes 30, which can have an infinite length, enables the user to ascertain which materials are required for the order in question, which means that he can determine the bill of materials for the output materials. Similarly, the output materials of an activity can be traced via arrow marked with dashes and dots 34 joining the activity with the first output interface node 31 of the activity 13. If there are several output materials, then an arrow 33 joins output interface node 31a to the next output interface node 31b, which represents the second material created. Like the input interface nodes 30, this chain can have an infinite length.

Figure 4:
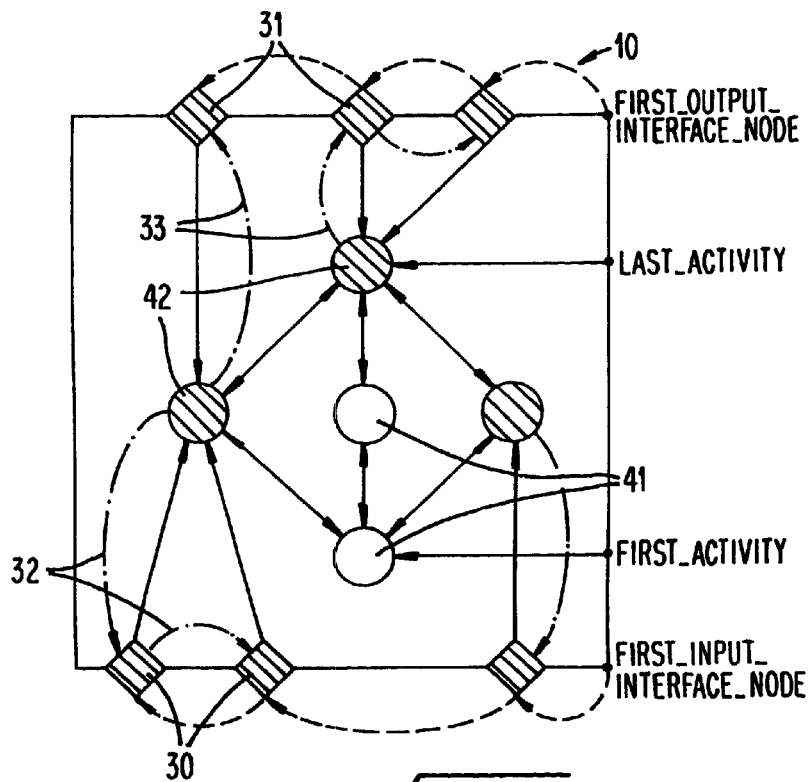
FIG. 4 is a representation of input activities, output activities, and activities with no input or output.

FIG. 4 illustrates order 10 having activities 41 with no input or output materials, and also activities such as assembly process 42 that both consume and create materials. Stock or a purchase order of a material is modeled by an order with one output interface node 31 and with no input interface nodes or activities. If the user wants to take the capacity of the vendor into account in modeling a purchase order, however, the purchase order must contain at least one activity representing the available capacity of the vendor (as accurately as possible). A plurality of purchase orders may be grouped into a "schedule line", which is modeled as a purchase order with several output interface nodes, each with a different delivery time. Customer requirements mirror purchase orders: each order has one input interface node 30, but no output interface nodes or activities. Orders that consume materials such as customer orders are modeled as "issuing elements", while orders that create materials are modeled as "receiving elements", allowing both types of orders to be modeled as objects similar to other components in the SCP model, thereby saving the need to create additional algorithms to operate on the model. An order without input or output interface nodes may exist, for example, as an order representing a test or maintenance on a resource.

Links may also be created between successive activities, said links containing references not only to successor activities, but also to the minimum and maximum time between activities. These temporal constraints can exist both between activities in the same order (inter-order constraints), and between activities belonging to different orders (cross-order constraints).

FIG. 5 illustrates inter-order temporal constraints between activities. As shown in FIG. 5a, activity 11d has three successor activities 11e, 11f, and 11g. Edges 50, 51 and 52 representing the temporal constraints have attributes, which are the minimum and maximum time interval between activities, and the type of temporal constraint, such as start-start, start-finish, finish-finish, or finish-start. References to successive activities are modeled by following the full and dotted straight arrows. In FIG. 5b, starting from activity 11d, first follow the arrow "succ_edge" 51 to reach the first successor activity from the small square 53 along the edge "succ_act" 52. This process is repeated from the first small square in order to reach all other successor activities successively. These small squares 53, also known as auxiliary objects, store the references to the successor activities, the next auxiliary object, and all the attributes of the temporal constraint between activities. The same technique can be used to model predecessor constraints, for example by following the curved arrows "pred_edge" 54 and "pred_act" 55 to find the predecessors of activity 11h.

Cross-order temporal constraints are illustrated in FIG. 6. A first order 61 and a second order 62 each contain three activities 11. There is a cross-order temporal constraint between activity 11j of first order 61 and activity 11n of second order 62. This constraint is mapped in the same way as described above for an inter-order temporal constraint, showing that activity 11j has successor activities 11k and 11o, and that activity 11o has predecessor activities (11j and 11n).

Similarly, "pegging" links two orders wherein one of the orders supplies a material consumed by the other order. Pegging tracks the type and quantity of material supplied by one order (the "subordinate order") to another order (the "superior order"). Pegging allows the planner to ascertain the superior and subordinate orders for any given order at any given time. If the planner reschedules the dates of an order, pegging allows all other orders influenced by this change to be updated.

Figure 7:
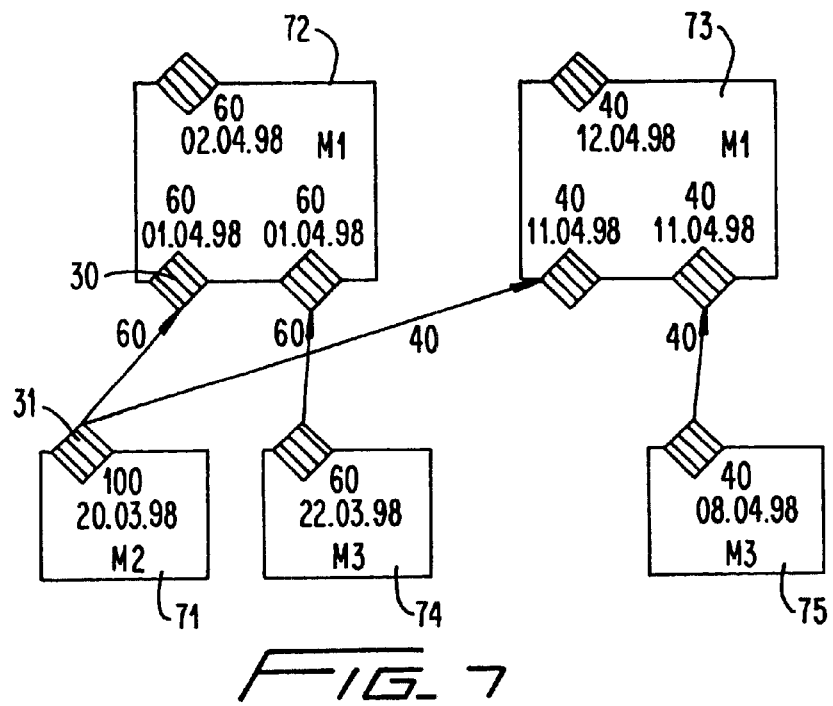
FIG. 7 is a representation of a simple order network with pegging.

FIG. 7 illustrates an example of pegging between orders, consisting of five orders 71, 72, 73, 74 and 75 that produce or consume materials M1, M2 and/or M3. As shown, for example, one piece each of M2 and M3 is required to produce M1. Next to each input interface node 30 is the required quantity and the requirements date, and next to each output interface 31 node is the quantity created and the availability date. For example, order 71 produces 100 M2, which is sufficient to satisfy the demands of orders 72 and 73 producing M1. There are also two separate orders 71 and 75 satisfying the demand of order 73.

Figure 8:
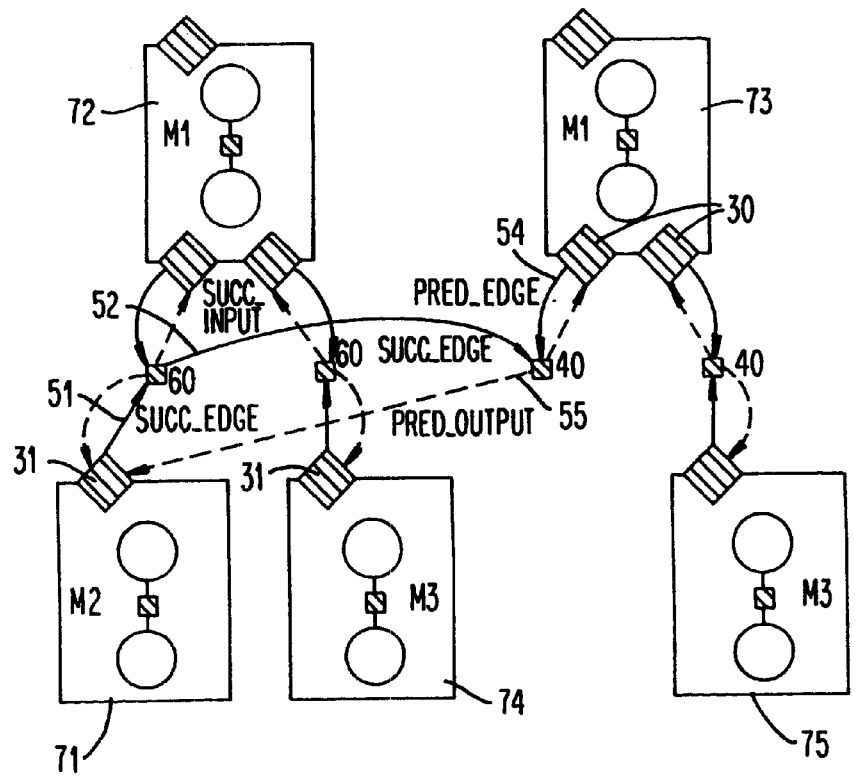
FIG. 8 is a representation of how pegging between orders is modeled.

As shown in FIG. 8, relationships between orders are mapped in the same manner as are temporal constraints between activities. The orders which M2 order 71 supplies can be found by starting from output interface node 31 of the M2 order 71 and alternately following the full straight arrows ("succ_edge") 51 and the dotted straight arrows ("succ_act") 52. Similarly, the orders that supply M1 order 73 can be found by starting from the input interface nodes 30 of M1 order 73, and alternately following the full curved arrows ("pred_edge") 54 and dotted curved arrows ("pred output") 55 to output interface node 31 of the supplying orders 71 and 75.

Figure 9:
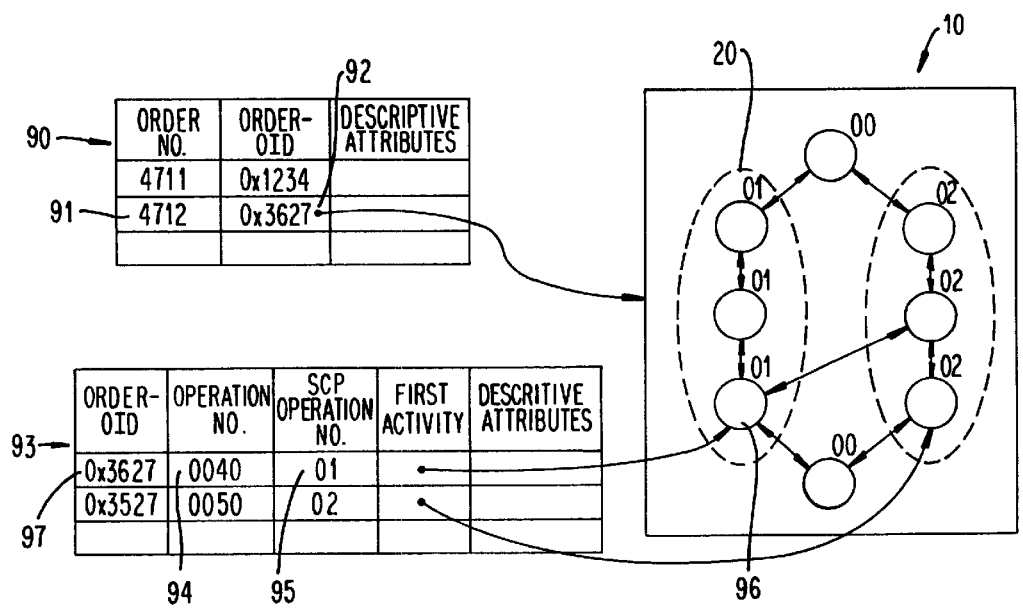
FIG. 9 is a representation of an order anchor and an operation anchor.

While pegging can link a large network of orders, not all orders have relationships to each other. Accordingly, the SCP network is usually a collection of disjunctive sub-networks, making it difficult to scan the whole network to locate a specific order. Accordingly, an "order anchor" 90 as shown in FIG. 9 can provide direct access to an order 10 or group of orders in the SCP network via an "order number" 91. This information is preferably stored in a RAM-buffered relational database table with a primary index for the order number and a secondary index for the reference to the order in the network, or object identity ("OID") 92. Similarly, an "operation anchor" 93 can provide direct access to an operation 20, or fused activities, within an order 10. The key 97 of the operation anchor 93 is the OID 92 for order 10, which is referenced to the predetermined operation number 94, an operation number within that order 95, and the first activity 96 of the respective operation 20. So for an application program to access a certain operation 20 of an order 10, it must first use the order anchor 90 to determine the OID 92 for the order, then use the operation anchor 93 to find the first activity 96 of the operation 20 that it is seeking.

Figure 10:
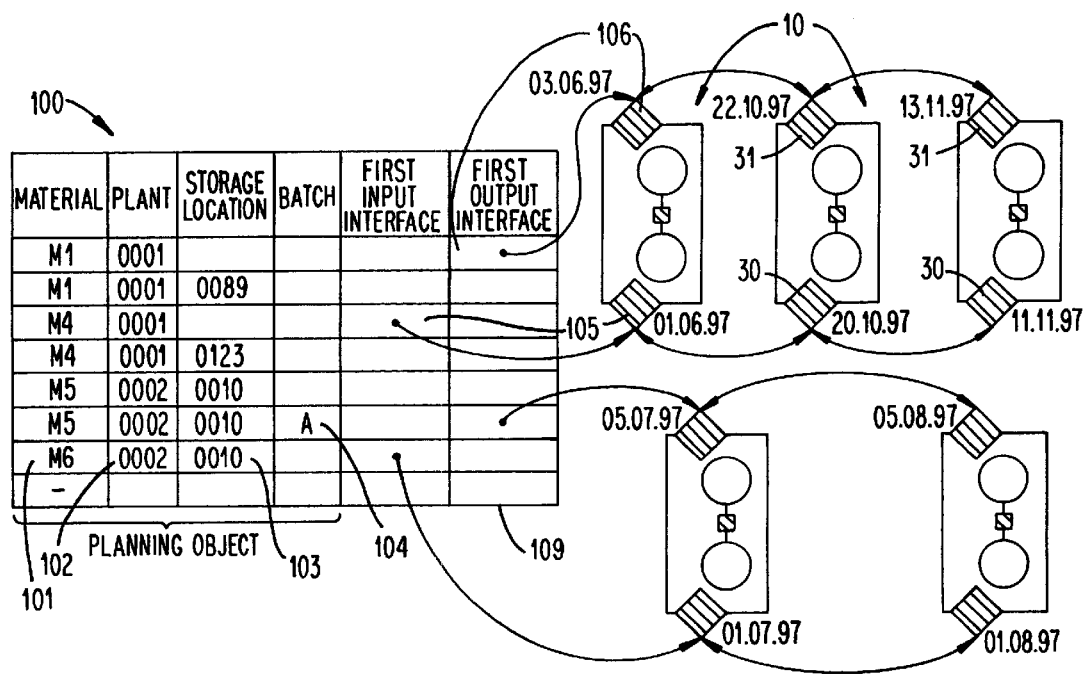
FIG. 10 is a representation of a planning object anchor.

Planning object anchors 100, illustrated in FIG. 10, enable an application program to determine efficiently all the orders 10 for a given material. Each material is identified in a relational database table according to its material number 101, plant 102, storage location 103, and batch 104, collectively known as a "planning object". Planning object anchors in table 109 reference to first input interface node 105 for material M4, and first output interface node 106 for material M1. All input interface nodes 30 and output interface nodes 31 of each material are kept in doubly concatenated lists which are sorted according to requirements and availability dates, as shown in FIG. 10. Thus, it is possible to select all receiving and issuing elements for each material or "planning object", which can be important for materials requirements planning.

Figure 11:
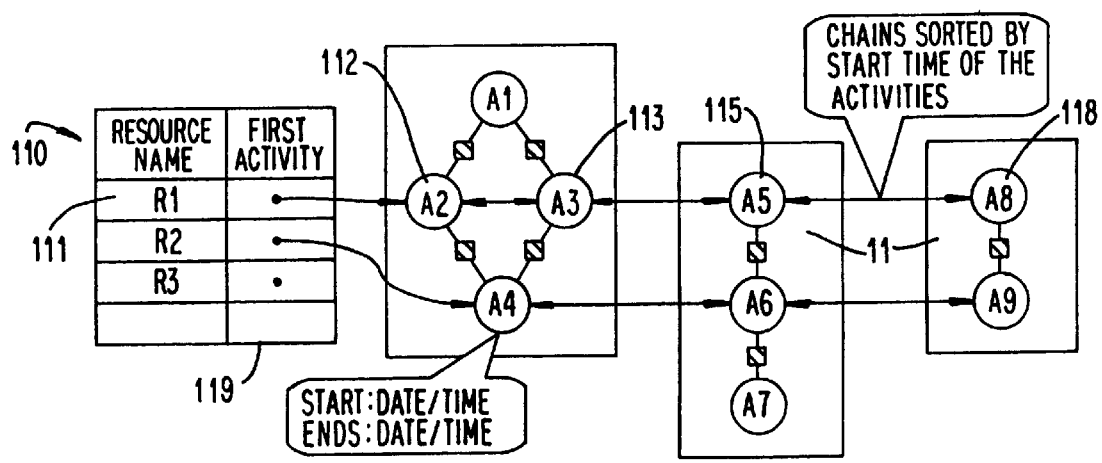
FIG. 11 is a representation of a resource anchor.

Since each activity preferably corresponds to one specific resource, a resource anchor is provided to enable an application program to determine all activities for a specific resource. FIG. 11 depicts a resource anchor 110 modeled as a relational database table 119 that references each resource number 111 to the corresponding first activity A2 scheduled on that resource. The first activity A2 112 is then linked to the next activity A3 113 scheduled on the same resource, which is in turn linked to subsequent activities A5 115 and A8 118 in chronological order according to schedule time. This facilitates the scheduling of new activities on particular resources. For example, in order to schedule a new activity on a resource, an applications program must first check the activity immediately before and the activity immediately after the proposed time for the new activity to determine whether there is sufficient time to perform the new activity on that resource. Since resource anchor 110 stores all activities of a particular resource chronologically referenced to that resource, this information is easily and rapidly accessible to an applications program.

What is claimed is:

1. A system for storing and processing supply chain planning information, said information organized and stored in a computer memory for access at a runtime by an application program for supply chain planning, said system comprising:

an input data containing said supply chain planning information about at least one resource, said data being inputted, organized and stored in said computer memory, wherein the organization of said input data comprises the steps of:

a) dividing said input data into plurality of activities, each one of said plurality of activities representing an individual working step in a production process, and being indivisible from a production planning perspective;

b) grouping said plurality of activities into plurality of orders, wherein related activities within same order are linked together into at least one network, each of said related activities referencing all immediately preceding and all immediately following activities in chronological sequence;

c) providing a direct link to a first and last activity within each said order, said direct link stored in a computer memory for access by supply chain planning application program during runtime;

d) providing at least one input interface node for each said order, wherein said input interface node represents a material required by said order, each input interface node being linked to all activities that require said material; and e) providing at least one output interface node for each said order, wherein said output interface node represents a material created by said order, each output interface node being linked to all activities that create said material;

wherein each output interface node of a first order of said plurality of orders is linked to reference a respective input interface node of each subsequent order of said plurality of orders, scheduled to require the material associated with said output interface node of said first order; and at least one application program running on said computer, said program accessing and processing said data for supply chain planning by utilizing said direct links stored in said computer memory for access to said first activity of a desired order within said plurality of orders, and thereafter utilizing said links among said related activities within the same order to schedule preceding and subsequent activities in proper chronological sequence, whereby allowing said supply chain planning application to determine and schedule efficiently all orders for a given resource, which results in reduction of runtime processing and maximization of delivery schedules for said resource.

2. The system of claim 1, wherein said reference to all chronologically-sequenced immediately preceding activities and said reference to all chronologically-sequenced immediately subsequent activities, each having at least two attributes, said at least two attributes including a minimum and maximum time interval between said activities and a type of temporal constraint.

3. The system of claim 1, wherein at least one of said plurality of activities has at least four attributes, said attributes including a start and finish time, a reference to the resource on which the activity is currently scheduled, and a reference to a list of one or more alternative resources.

4. The system of claim 1, wherein each said input interface node contains information regarding the required material, required quantity, the time at which said required material is required, and any shortage of said required material, said shortage defined as a difference between the required quantity and the quantity of said required material that is delivered by other orders or stock, and wherein each output interface node contains information regarding the created material, created quantity, the time at which said created material is created, and any surplus of said created material, said surplus defined as the difference between the created quantity and the quantity of said created material that is not yet delivered to other orders.

5. The system of claim 1, wherein at least one of said plurality of orders has at least one pre-assigned order number, and wherein said system further comprises a database table having an entry for each pre-assigned order number matched to its object identity, which is a reference to the respective order in said plurality of orders.

6. The system of claim 1, wherein a plurality of said activities within at least one order are identified and grouped as at least one operation, each said operation having a pre-assigned operation number, wherein said system further comprises a database table with an entry for each object identity and pre-assigned operation number matched to the earliest activity for said respective operation.

7. The system of claim 1 wherein each material has a pre-assigned material number, said system further comprising a database table having an entry for each pre-assigned material number matched to reference at least one input interface node at which the respective material is required, and an entry for each pre-assigned material number matched to reference at least one output interface node at which the respective material is created.

8. The system of claim 7, wherein said database table further contains identifying information for each material, comprising at least one of plant, storage location and batch.

9. The system of claim 1, wherein each resource has a pre-assigned resource number, said system further comprising a database table having an entry for each pre-assigned resource number matched to a chronological sequence of activities scheduled on the respective resource.

10. The system of claim 1, wherein said plurality of orders comprises a first order and m subsequent orders, whereby each input interface node of said m subsequent orders is linked to a respective input interface node of said first order, such that said first order supplies the material demands of said m subsequent orders.

11. The system of claim 1, wherein one of said plurality of orders has k output interface nodes, representing an order producing k different materials.

12. The system of claim 1, wherein a plurality of activities are grouped to form an operation, and wherein a first activity of said operation represents the set up for production, and wherein said successive activities for said operation represent the steps in production.

13. A computerized system for storing, managing and processing of a supply chain planning information by a supply chain planning application program, said system comprising:
 a computer with memory for storing an input data containing supply chain planning information about at least one resource, said input data being inputted, stored and organized in said memory, wherein said organization of said input data comprises the steps of:
 a) dividing said input data into plurality of activities, each one of said plurality of activities representing an individual working step in a production process;
 b) grouping said plurality of activities into plurality of orders, wherein related activities within same order are linked together into at least one network, each of said related activities referencing all immediately preceding and -all immediately following activities in chronological sequence;
 c) providing a direct link to a first and last activity within each said order, said direct link stored in a computer memory for access by supply chain planning application program during runtime;
 d) providing at least one input interface node for each said order, wherein said input interface node represents a material consumed by said order, each input interface node being linked to all activities that consume said material; and
 e) providing at least one output interface node for each said order, wherein said output interface node represents a material created by said order, each output interface node being linked to all activities that create said material;
  wherein each output interface node of a first order of said plurality of orders is linked to reference a respective input interface node of each subsequent order of said plurality of orders, scheduled to consume the material associated with said output interface node of said first order; and
 at least one application program for accessing and processing said data for supply chain planning, wherein said application program utilizes said direct links stored in said computer memory for access to said first activity of a desired order within said plurality of orders, and thereafter utilizing said links among said related activities within the same order for scheduling preceding and subsequent activities in chronological sequence,
 whereby allowing said supply chain planning application to determine and schedule efficiently all orders for a given resource in proper chronological sequence.

14. The computerized system of claim 13, wherein each said input interface node contains information regarding a consumed material, consumed quantity, a time at which said consumed material is to be consumed, and any shortage of said consumed material, said shortage defined as the difference between the quantity required for consumption and the quantity of said consumed material that is delivered by other orders or stock.

15. The computerized system of claim 13, wherein each output interface node contains information regarding a created material, created quantity, a time at which said created material is to be created, and any surplus of said created material, said surplus defined as the difference between the created quantity and the quantity of said created material that is not yet delivered to other orders.

16. The computerized system of claim 13, wherein each of said plurality of orders has a pre-assigned order number, said system further comprising a database table having an entry for each pre-assigned order number matched to its object identity, which is a reference to the respective order in said plurality of orders.

17. The computerized system of claim 13, wherein each material has a pre-assigned material number, said system further comprising a database table having an entry for each pre-assigned material number matched to reference at least one input interface node at which the respective material is consumed, and an entry for each pre-assigned material number matched to reference at least one output interface node at which the respective material is created.

18. The computerized system of claim 17, wherein said database table further comprises identifying information for each material including at least one of plant, storage location and batch.

19. The computerized system of claim 13, wherein said plurality of orders comprises n orders and one subsequent order whereby each output interface node of said n orders is linked to a respective input interface node of said one subsequent order, such that said one subsequent order consumes the materials supplied by said n orders.

20. A computerized system for storing, managing and processing of a supply chain planning information by a supply chain planning application program, said system comprising:

a computer with memory for storing an input data containing supply chain planning information about at least one resource, said input data being inputted, stored and organized in said memory, wherein said organization of said input data comprises the steps of:

a) dividing said input data into plurality of activities, each one of said plurality of activities representing an individual working step in a production process;

b) grouping said plurality of activities into plurality of orders, wherein related activities within same order are linked together into at least one network, each of said related activities referencing all immediately preceding and all immediately following activities in chronological sequence, wherein said reference to all immediately preceding activities and said references to all immediately subsequent activities each have at least two attributes, said at least two attributes including the minimum and maximum time interval between activities and a type of temporal constraint;

c) providing a direct link to a first and last activity within each said order, said direct link stored in a computer memory for access by supply chain planning application program during runtime; and at least one application program for accessing and processing said data for supply chain planning, wherein said application program utilizes said direct links stored in said computer memory for access to said first activity of a desired order within said plurality of orders, and thereafter utilizing said links among said related activities within the same order for scheduling preceding and subsequent activities in proper chronological sequence, whereby allowing said supply chain planning application to determine and schedule efficiently all orders for a given resource.

21. The computerized system of 20, wherein a plurality of said activities within at least one order constitute an operation, and wherein each operation has a pre-assigned operation number, and said system further comprising a database table having an entry for each object identity and pre-assigned operation number matched to the earliest activity fore said respective operation.

22. A computerized system for storing, managing and processing of a supply chain planning information by a supply chain planning application program, said system comprising:

a computer with memory for storing an input data containing supply chain planning information about at least one resource, said input data being inputted, stored and organized in said memory, wherein said organization of said input data comprises the steps of:

a) dividing said input data into plurality of activities, each one of said plurality of activities representing an individual working step in a production process;

b) grouping said plurality of activities into plurality of orders, wherein related activities within same order, are linked together into at least one network, each of said related activities referencing all immediately preceding and all immediately following activities in chronological sequence;

c) providing a direct link to a first and last activity within each said order, said direct link stored in a computer memory for access by supply chain planning application program during runtime;

d) grouping a plurality of said activities within at least one order as at least one operation;

e) providing for each said operation a pre-assigned operation number;

at least one database table having an entry for each object identity and containing said pre-assigned operation number defining at least one operation to be performed on said object, said table further comprising a lined reference to the earliest activity for said respective defined operation on said object; and at least one application program for accessing and processing said data for supply chain planning, wherein said application program utilizes said direct links stored in said computer memory for access to said first activity of a desired order within said plurality of orders, and thereafter utilizing said links among said related activities within the same order for scheduling preceding and subsequent activities in proper chronological sequence.

* * * * *